(12) United States Patent
Gao et al.

(10) Patent No.: US 10,622,931 B1
(45) Date of Patent: Apr. 14, 2020

(54) NEGATIVE-SLOPE VOLTAGE-FREQUENCY FOR STARTING A VARIABLE FREQUENCY INDEPENDENT SPEED MOTOR AND SPEED CONTROL

(71) Applicant: The Boeing Company, Chicago, IL (US)

(72) Inventors: Lijun Gao, Renton, WA (US); Shengyi Liu, Sammamish, WA (US)

(73) Assignee: BOEING COMPANY, THE, Chicago, IL (US)

( * ) Notice: Subject to any disclaimer, the term of this patent is extended or adjusted under 35 U.S.C. 154(b) by 0 days.

(21) Appl. No.: 16/215,229

(22) Filed: Dec. 10, 2018

(51) Int. Cl.
*H02P 27/04* (2016.01)

(52) U.S. Cl.
CPC .......... *H02P 27/047* (2013.01); *H02P 27/045* (2013.01)

(58) Field of Classification Search
CPC ............................. H02P 27/047; H02P 27/045
USPC ................................. 318/805, 798, 767, 727
See application file for complete search history.

(56) References Cited

U.S. PATENT DOCUMENTS 9,673,743 B1 * 6/2017 Billson ................... H02P 23/26

* cited by examiner

*Primary Examiner* — David Luo
(74) *Attorney, Agent, or Firm* — Parsons Behle & Latimer

(57) ABSTRACT

A method may include transmitting an excitation signal from a stator of a motor to a rotor of the motor, where the excitation signal is received at a set of rotor windings, and where the excitation signal produces a rotating magnetic flux at the rotor that generates a first alternating current (AC) voltage at a set of stator windings. The method may further include controlling the excitation signal to equalize and synchronize the first AC voltage to a second AC voltage at an AC bus. After the synchronization, the method may also include electrically connecting the set of stator windings to the AC bus. The method may include reducing an amplitude of the excitation signal to enable current flow from the AC bus to the set of stator windings, thereby generating torque that results in rotation of the rotor.

20 Claims, 9 Drawing Sheets

600 ⇘

602
Transmit an excitation signal from a stator of a motor to a rotor of the motor, where the excitation signal is received at a set of rotor windings, and where the excitation signal produces a rotating magnetic flux at the rotor, the rotating magnetic flux generating a first alternating current (AC) voltage at a set of stator windings

604
Control the excitation signal to equalize a first amplitude of the first AC voltage at the set of stator windings to a second amplitude of a second AC voltage at an AC bus and to synchronize the first AC voltage to the second AC voltage

606
After the first AC voltage at the set of stator windings is synchronized with the second AC voltage at the AC bus, electrically connect the set of stator windings to the AC bus

608
Reduce an amplitude of the excitation signal to enable current flow from the AC bus to the set of stator windings, thereby generating torque that results in rotation of the rotor

FIG. 6A

NEGATIVE-SLOPE VOLTAGE-FREQUENCY FOR STARTING A VARIABLE FREQUENCY INDEPENDENT SPEED MOTOR AND SPEED CONTROL

FIELD OF THE DISCLOSURE

This disclosure is generally related to the field of starting a variable frequency independent speed (VFIS) motor and, in particular, to systems and methods for negative-slope voltage-frequency for starting a VFIS and for speed control.

BACKGROUND

A VFIS motor is a motor that may run at a rotational frequency that is independent of an amplitude, frequency, and phase of an alternating current (AC) power signal used to power the motor. Further, typical AC motors may achieve rotational frequencies that are independent of an amplitude, frequency, and phase of a driving AC power signal using rectifiers and inverters that perform full-power level power conversions of the driving AC power signal. VFIS motors, on the other hand, may operate without performing such full power rated power conversions.

Starting a VFIS motor by connecting it directly to an AC bus may cause damage to the stator windings of the VFIS motor. For example, because a non-moving VFIS motor does not create a significant electrical impedance within the stator windings, a sudden surge of power may cause a short circuit within the windings resulting in significant heat, and possible breakdown. Applying a sudden starting current to the VFIS motor may cause its electrical components to wear out prematurely.

Additionally, typical speed control techniques, such as variable frequency drive techniques and field-oriented control techniques may not work with VFIS motors because the VFIS motors may have active windings on both a stator and a rotor. As such, new starting techniques and new techniques for speed control are needed within the industry to accommodate VFIS motors. Other disadvantages may exist.

SUMMARY

Disclosed herein is a system and method for starting a VFIS motor and for speed control. The system and method may operate in a synchronization phase and in a speed regulation phase. During the synchronization phase, an excitation signal may be transferred to a rotor of a motor and applied to a set of rotor windings. The excitation signal may produce a rotating magnetic flux at the rotor that generates a first alternating current (AC) voltage at a set of stator windings. The first AC voltage may be equalized and synchronized with a second AC voltage on an AC bus, after which the AC bus may be coupled to the set of stator windings. Because the first AC voltage and the second AC voltage are equal, no current may flow through the set of stator windings resulting in no rotation of the rotor.

During the speed regulation phase, an amplitude of the excitation signal may be gradually reduced, resulting in a current gradually growing within the set of stator windings. The amplitude of the excitation signal may be reduced according to a negative-slope voltage-frequency relationship. As the voltage is reduced, the current within the stator windings may increase resulting in a second rotating magnetic flux, which may interact with the first rotating magnetic flux to begin rotation of the rotor.

In an embodiment, a system includes a motor having a stator, a rotor, a set of stator windings, and a set of rotor windings. The system further includes a high frequency transformer configured to transmit an excitation signal from the stator to the rotor, where the excitation signal is received at the set of rotor windings, and where the excitation signal produces a rotating magnetic flux at the rotor, the rotating magnetic flux generating a first alternating current (AC) voltage at the set of stator windings. The system also includes a switch electrically connected between the set of stator windings and an AC bus. The system includes a controller circuit configured to control the excitation signal to equalize a first amplitude of the first AC voltage at the set of stator windings to a second amplitude of a second AC voltage at the AC bus and to synchronize the first AC voltage to the second AC voltage, the control circuit further configured to close the switch after the first AC voltage is synchronized with the second AC voltage and to reduce an amplitude of the excitation signal to enable current flow from the AC bus to the set of stator windings, thereby generating torque that results in rotation of the rotor.

In some embodiments, the system includes an excitation source circuit configured to receive an amplitude excitation source control signal, a frequency excitation source control signal, and a phase excitation source control signal from the controller circuit, and to generate the excitation signal based on the amplitude excitation source control signal, the frequency excitation source control signal, and the phase excitation source control signal. In some embodiments, the system includes a first voltage signal sensor electrically coupled between the switch and the set of stator windings, and configured to provide a measurement of the first AC voltage at the set of stator windings to the controller circuit, and a second voltage signal sensor electrically coupled between the AC bus and the switch, and configured to provide a measurement of the second AC voltage. In some embodiments, the motor is a variable frequency independent speed (VFIS) motor. In some embodiments, the set of stator windings is a set of 3-phase stator windings, and wherein the set of rotor windings is a set of 3-phase rotor windings. In some embodiments, the AC bus is a 3-phase AC bus.

In an embodiment, a method includes transmitting an excitation signal from a stator of a motor to a rotor of the motor, where the excitation signal is received at a set of rotor windings, and where the excitation signal produces a rotating magnetic flux at the rotor, the rotating magnetic flux generating a first alternating current (AC) voltage at a set of stator windings. The method further includes controlling the excitation signal to equalize a first amplitude of the first AC voltage at the set of stator windings to a second amplitude of a second AC voltage at an AC bus and to synchronize the first AC voltage to the second AC voltage. The method also includes, after the first AC voltage at the set of stator windings is synchronized with the second AC voltage at the AC bus, electrically connecting the set of stator windings to the AC bus. The method includes reducing an amplitude of the excitation signal to enable current flow from the AC bus to the set of stator windings, thereby generating torque that results in rotation of the rotor.

In some embodiments, the method includes receiving an amplitude excitation source control signal, a frequency excitation source control signal, and a phase excitation source control signal, and generating the excitation signal based on the amplitude excitation source control signal, the frequency excitation source control signal, and the phase excitation source control signal. In some embodiments, the method includes measuring the first AC voltage at the set of stator windings, measuring the second AC voltage at the AC bus, calculating an amplitude difference, a frequency difference, and a phase difference between the first AC voltage and the second AC voltage, and, when the amplitude difference falls below a first threshold value, the frequency difference falls below a second threshold value, and the phase difference falls below a third threshold value, determining that the first AC voltage is synchronized with the second AC voltage.

In some embodiments, the method includes receiving a speed reference value, calculating a reference frequency value based on the speed reference value, determining an excitation reference voltage from the reference frequency value based on data that maps voltage values with rotor frequency values, and setting the amplitude of the excitation signal to the excitation reference voltage to cause the rotor to rotate at the speed reference value. In some embodiments, determining the excitation reference voltage includes storing the data that maps the voltage values with the rotor frequency values, and retrieving the excitation reference voltage from the data based on the reference frequency value. In some embodiments, determining the excitation reference voltage includes gradually reducing the excitation reference voltage over a period of time.

In some embodiments, the method includes determining a reference excitation frequency based on the reference frequency and based on a measured frequency of the second AC voltage at the AC bus and setting a frequency of the excitation signal to the reference excitation frequency. In some embodiments, determining the reference excitation frequency includes gradually changing the reference excitation frequency over a period of time. In some embodiments, the method includes determining a reference excitation phase, and setting a phase of the excitation signal to the reference excitation phase. In some embodiments, determining the reference excitation phase includes storing data indicating a measured phase of the second AC voltage at the AC bus in a memory, and generating the reference excitation phase based on the data indicating the measured phase.

In an embodiment, a system includes a synchronization control module configured to measure a first AC voltage at a set of stator windings, to measure a second AC voltage at an AC bus, to generate an excitation synchronization signal based on the first AC voltage) and the second AC voltage, and to generate a switch control signal based on the first AC voltage and the second AC voltage. The system further includes a motor speed control module configured to receive a speed reference value and measurements of the second AC voltage and to generate an excitation reference signal based on the speed reference value and the measurements of the second AC voltage. The system also includes an excitation source control module configured to generate an excitation source control signal based on the excitation synchronization signal or based on the excitation reference signal. The system includes a switch configured to route the excitation synchronization signal to the excitation source control module during a synchronization phase and to route the excitation reference signal to the excitation source control module during a motor speed regulation phase.

In some embodiments, the synchronization control module includes a first amplitude and phase analyzer module configured to measure the first AC voltage, a second amplitude and phase analyzer module configured to measure the second AC voltage, a set of difference modules configured to calculate an amplitude difference, a frequency difference, and a phase difference between the first AC voltage and the second AC voltage, a set of comparison modules configured to determine whether the amplitude difference falls below a first threshold value, whether the frequency difference falls below a second threshold value, and whether the phase difference falls below a third threshold value, a logic module configured to generate the switch control signal based on an output from the set of comparison modules, and a set of proportional-integral-derivative controllers configured to generate the excitation synchronization signal based on the amplitude difference, the frequency difference, and the phase difference.

In some embodiments, the motor speed control module includes a constant multiplier module configured to convert the speed reference value into a reference frequency value, a negative slope voltage-frequency control module configured to receive the reference frequency value and to calculate an intermediate excitation reference voltage based on the reference frequency value, a first difference circuit configured to generate an intermediate excitation reference frequency value based on the reference frequency value and based on a measured frequency of the second AC voltage at the AC bus, a second difference circuit, a first proportional-integral-derivative controller, and a first slope module configured together to generate an excitation reference voltage and to gradually change the excitation reference voltage over a period of time to match the intermediate excitation reference voltage, and a third difference circuit, a second proportional-integral-derivative controller, and a second slope module configured together to generate an excitation reference frequency value based on the intermediate excitation reference frequency value and to modify the excitation reference frequency value over a period of time to match the intermediate excitation reference frequency value, wherein the excitation reference signal includes the excitation reference voltage and the excitation reference frequency value.

In some embodiments, the motor speed control module further includes a memory module configured to store a measured phase value and to generate an excitation reference phase value that matches the measured phase value, where the excitation reference signal includes the excitation reference phase value.

BRIEF DESCRIPTION OF THE DRAWINGS

FIG. 6A is a flow diagram depicting a method for starting a VFIS motor and for speed control.

Figure 1:
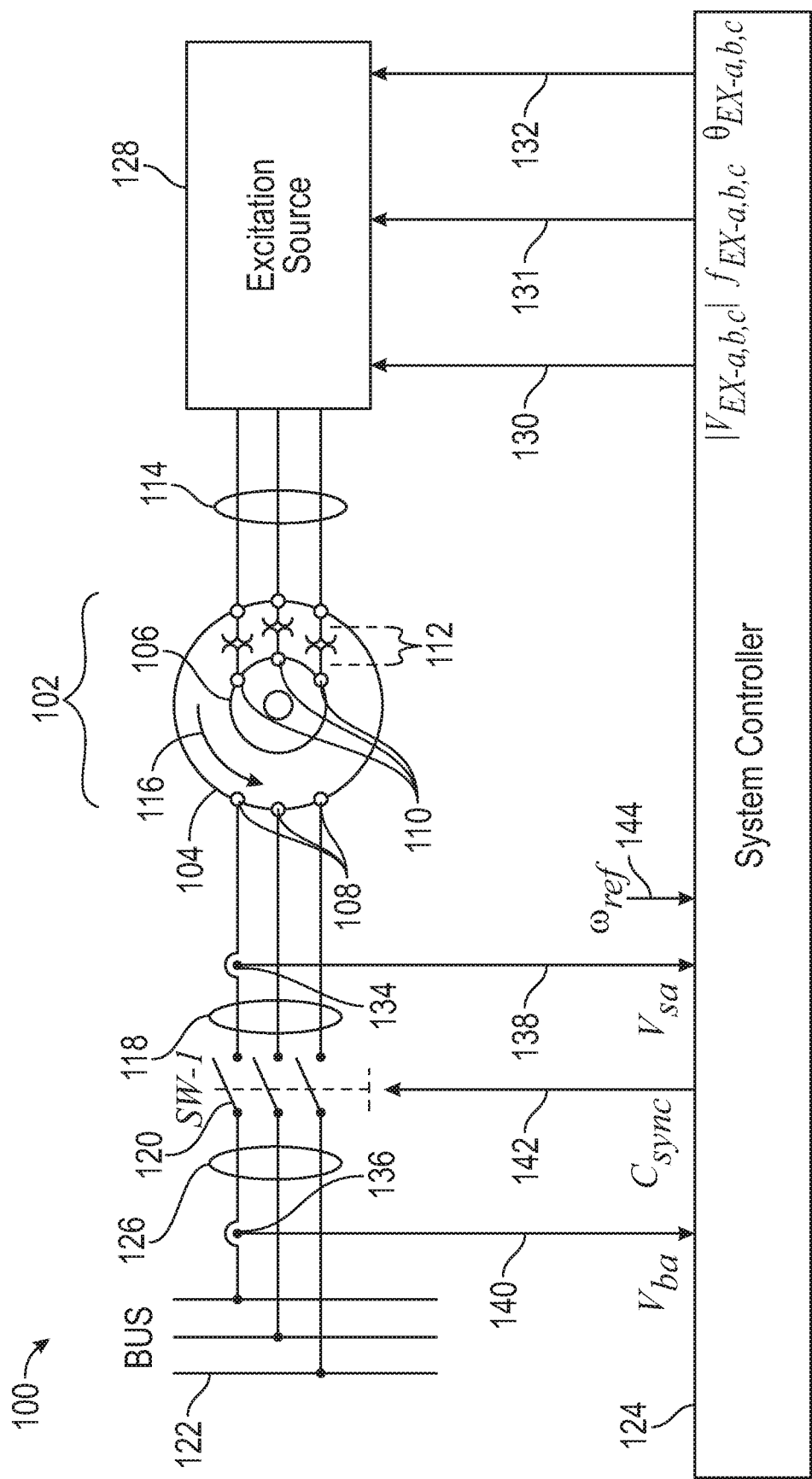
FIG. 1 is a block diagram depicting an embodiment of a system for starting a VFIS motor and for speed control.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a system 100 for motor starting and for speed control is depicted. The system 100 may include a motor 102. The motor 102 may include a stator 104 and a rotor 106 configured to rotate relative to the stator 104. The stator 104 may include a set of stator windings 108 and the rotor 106 may include a set of rotor windings 110. In some embodiments, the motor 102 may be a variable frequency independent speed (VFIS) motor. Notably, a VFIS motor may operate in conjunction with a motor control unit (not shown) to control a rotational frequency of the VFIS motor independently from a frequency, amplitude, and phase of a power signal used to drive the VFIS motor. The rotational frequency of the VFIS motor may be controlled without performing a full-power rated power conversion of the power signal. An example of a motor capable of being used with the system 100 is further described in U.S. patent application Ser. No. 15/982,470, filed on May 17, 2018 and entitled "Variable Frequency Independent Speed Motor," the contents of which are hereby incorporated herein, in their entirety.

As used herein, a "full-power rated power conversion" occurs when a converter carries a power level equal to that of a generator or a motor which it drives or controls. Full-power rated power conversions are typically performed by a rectifier circuit, which converts substantially all the energy in a power signal from an AC signal to a direct current (DC) signal, and by an inverter circuit, which converts substantially all the energy in the power signal from a DC signal to an AC signal. The power losses during these conversions may be significant. Further, the hardware used to perform the conversions may add additional weight and complexity to a power distribution system.

A high frequency transformer 112 may be configured to transfer an excitation signal 114 from the stator 104 to the rotor 106, wherein the excitation signal 114 may be applied to the set of rotor windings 110. Depending on an amplitude, frequency, and phase of the excitation signal 114, a current may be generated within the set of rotor windings 110 that may generate a rotating magnetic flux 116 that rotates relative to the rotor 106. The rotating magnetic flux 116 may generate a first alternating current (AC) voltage 118 at the set of stator windings 108. The set of stator windings 108 and the set of rotor windings 110 may be 3-phase stator and rotor windings.

The system 100 may further include a switch 120 which may be configured to isolate the set of stator windings 108 from an AC bus 122 in a first state. As such, a second AC voltage 126 at the AC bus 122 may be isolated from the first AC voltage 118. In a second state, the switch 120 may be configured to electrically connect the AC bus 122 to the set of stator windings 108. The AC bus 122 may be a 3-phase AC bus.

The system 100 may include a system controller circuit 124 and an excitation source circuit 128. The system controller circuit 124 may be configured to control the excitation source circuit 128 by providing an amplitude excitation source control signal 130, a frequency excitation source control signal 131, and a phase excitation source control signal 132 to the excitation source circuit 128. Based on the signals 130-132, the excitation source circuit 128 may generate the excitation signal 114.

The system controller circuit 124 may be implemented as a processor and memory, analog circuitry, logic circuitry, or a combination thereof. Specific modules associated with the system controller circuit 124 are further described herein and may be implemented as logic circuitry within the system controller circuit 124. Alternatively, the modules may be implemented as a processor in conjunction with a memory storing instructions corresponding to the modules.

The system 100 may include a first voltage signal sensor 134 and a second voltage signal sensor 136. The first voltage signal sensor 134 may be configured to measure the first AC voltage 118 and to transmit measurements 138 to the system controller circuit 124. The second voltage signal sensor 136 may be configured to measure the second AC voltage 126 and to transmit measurements 140 to the system controller circuit 124. In some embodiments, the first voltage signal sensor 134 and the second voltage signal sensor 136 may be part of the system controller circuit 124.

During operation, the system controller circuit 124 may start in a synchronization phase. During the synchronization phase, the switch 120 may be opened to prevent current from flowing from the AC bus 122 to the set of stator windings 108. The measurements 138 of the first AC voltage 118 and the measurements 140 of the second AC voltage 126 may be received by the system controller circuit 124. The system controller circuit 124 may transmit the amplitude excitation source control signal 130, the frequency excitation source control signal 131, and the phase excitation source control signal 132 to the excitation source circuit 128 in order to generate the excitation signal 114, which may be transferred to the set of rotor windings 110 on the rotor 106, via the high frequency transformer 112. The excitation signal 114 may produce the rotating magnetic flux 116, which may induce the first AC voltage 118. In this way, the system controller circuit 124 may control the first AC voltage 118.

The system controller circuit 124 may control the excitation signal 114 to equalize an amplitude of the first AC voltage 118 at the set of stator windings 108 to an amplitude of the second AC voltage 126 at the AC bus 122 and to synchronize the first AC voltage 118 to the second AC voltage 126. Synchronizing the first and second AC voltages 118, 126 may include adjusting the first AC voltage 118 until a frequency and a phase of the first and second AC voltages 118, 126 match. After the first AC voltage 118 is synchronized with the second AC voltage 126, the system controller circuit 124 may be configured to close the switch 120 by sending a switch control signal 142.

During the speed regulation phase, an amplitude of the excitation signal 114 may be gradually reduced, resulting in a reduced amplitude in the first AC voltage 118. The reduced first AC voltage 118 may result in a current that may gradually grow within the set of stator windings 108. The amplitude of the excitation signal 114 may be reduced according to a negative-slope voltage-frequency relationship. As the amplitude is reduced, the current within the set of stator windings 108 may increase resulting in a second rotating magnetic flux, which may interact with the first rotating magnetic flux 116 to begin rotation of the rotor 106. A speed reference value 144 may be received by the system controller circuit 124 to determine a speed of the rotor 106 during the speed regulation phase, as discussed herein.

A benefit of the system 100 is that the motor 102 may be started without immediately connecting it directly to the AC bus 122. As such damage and premature wearing due to a sudden surge of power may be avoided. Other benefits may exist.

Figure 2:
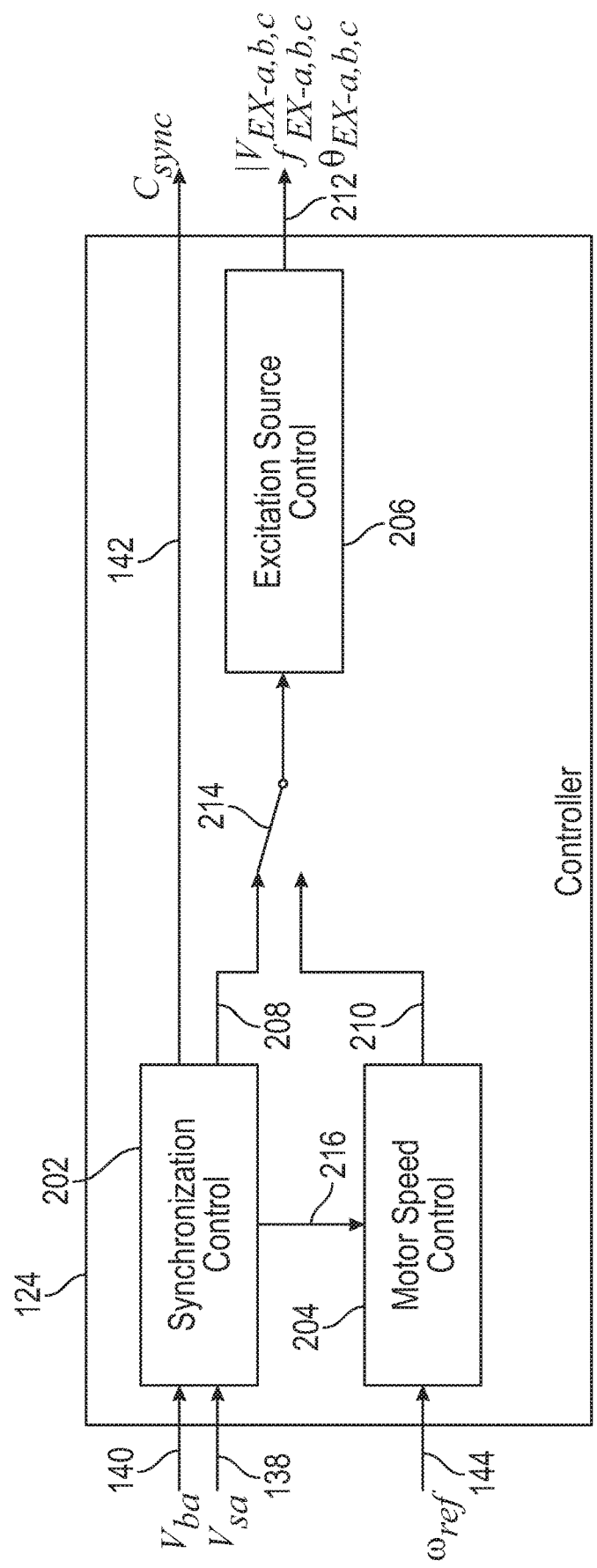
FIG. 2 is a block diagram depicting an embodiment of a controller circuit for a system for starting a VFIS motor and for speed control.

Referring to FIG. 2, a system controller circuit 124 for starting a VFIS motor and for speed control is depicted. The controller circuit 124 may include a synchronization control module 202, a motor speed control module 204, and an excitation source control module 206. Specific modules associated with the system controller circuit 124 may be implemented as logic circuitry within the system controller circuit 124 or as a processor in conjunction with a memory storing instructions corresponding to the modules.

The synchronization control module 202 may be configured receive a measurement 138 of a first AC voltage (e.g., the first AC voltage 118 of FIG. 1) and to receive a measurement 140 of a second AC voltage at an AC bus (e.g., the second AC voltage 126 of FIG. 1). In some embodiments, the synchronization control module 202 may be configured to and include circuitry to measure each of the AC voltages 118, 126 rather than merely receive the measurements 138, 140. Based on the measurements 138, 140, the synchronization control module 202 may be configured to generate an excitation synchronization signal 208, which may be used by the excitation source control module 206 to generate an excitation source control signal 212. The excitation source control signal 212 may include the amplitude excitation source control signal 130, the frequency excitation source control signal 131, and the phase excitation source control signal 132, described in FIG. 1, and may be used to synchronize the AC voltages 118, 126. After the AC voltages 118, 126 are synchronized, the synchronization control module 202 may be configured to generate a switch control signal 142. The switch control signal 142 may be used to close the switch 120 of FIG. 1 to electrically connect the AC bus 122 to the set of stator windings 108.

The motor speed control module 204 may be configured to receive a speed reference value 144 and measurements 216 associated with the second AC voltage (i.e., the second AC voltage 126 of FIG. 1) and to generate an excitation reference signal 210 based on the speed reference value 144 and the measurements 216.

The excitation source control module 206 may be configured to generate the excitation source control signal 212 based on the excitation synchronization signal 208 or based on the excitation reference signal 210. For example, a switch 214 may be configured to route the excitation synchronization signal 208 to the excitation source control module 206 during a synchronization phase and to route the excitation reference signal 210 to the excitation source control module 206 during a motor speed regulation phase.

Figure 3A:
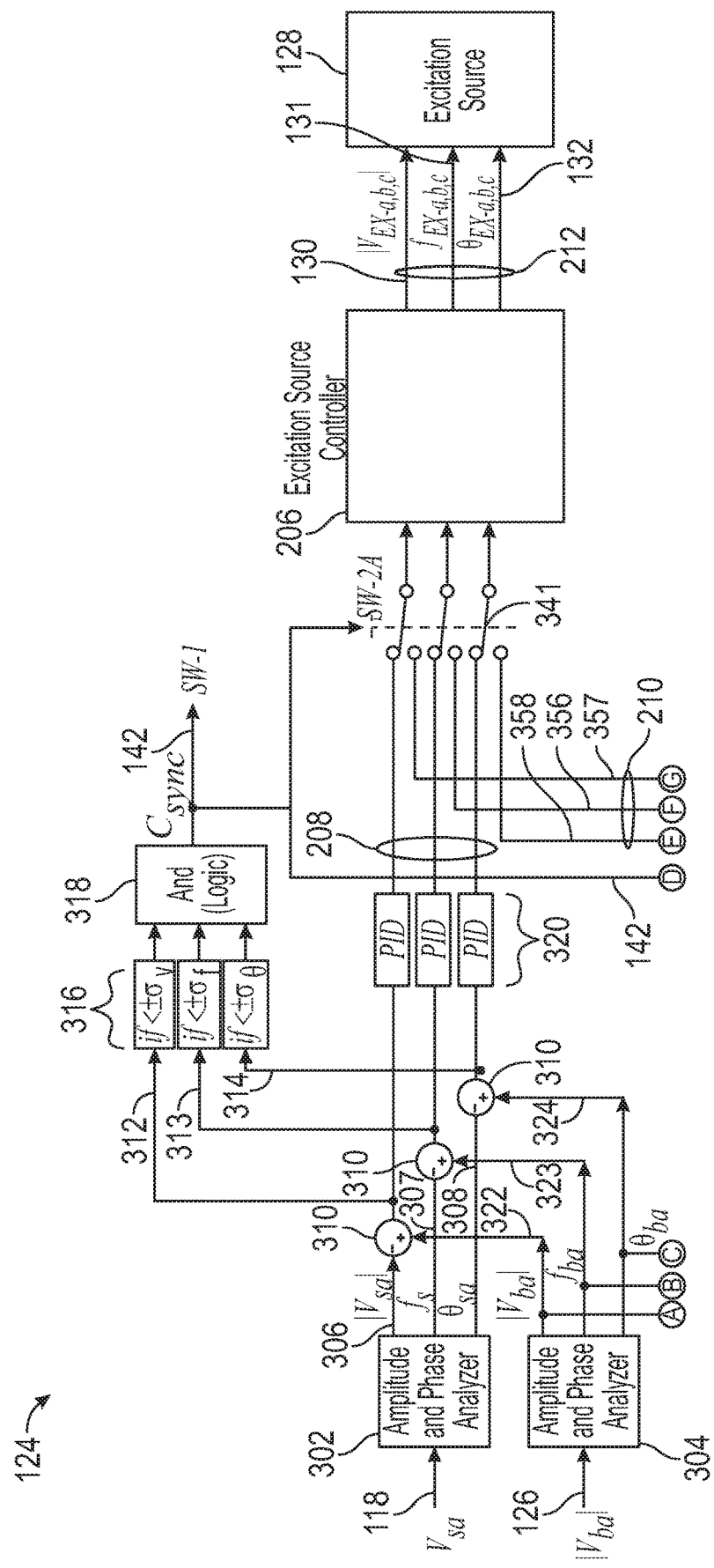
FIGS. 3A and 3B are a block diagram depicting an embodiment of signal paths for a controller circuit for a system for starting a VFIS motor and for speed control.
Figure 3B:
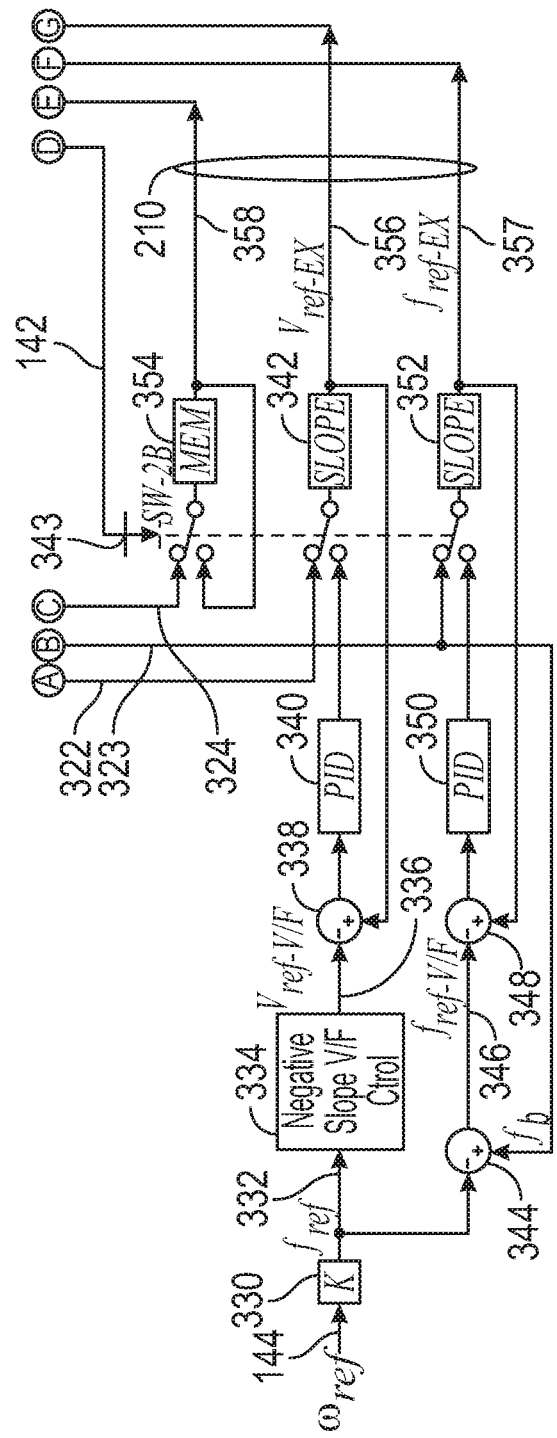

Referring to FIGS. 3A and 3B, a system controller circuit 124 for a system for starting a VFIS motor and for speed control are depicted. The described functions may be performed by logic circuitry, by a processor coupled with a memory having instructions that cause the processor to perform the functions, or by any combination thereof.

Referring to FIG. 3A, the controller circuit 124 may include a first amplitude and phase analyzer module 302 configured to measure the first AC voltage 118 and a second amplitude and phase analyzer module 304 configured to measure the second AC voltage 126. The amplitude and phase analyzer modules 302, 304 may include, for example, the voltage signal sensors 134, 136 from FIG. 1. The first amplitude and phase analyzer module 302 may generate a first voltage amplitude signal 306, a first voltage frequency signal 307, and a first voltage phase signal 308. Likewise, the second amplitude and phase analyzer module 304 may generate a second voltage amplitude signal 322, a second voltage frequency signal 323, and a second voltage phase value 324.

A set of difference modules 310 may be configured to calculate an amplitude difference 312, a frequency difference 313, and a phase difference 314 between the first AC voltage 118 and the second AC voltage 126. The amplitude difference 312, the frequency difference 313, and the phase difference 314 may be implemented as signals and may be passed to a set of comparison modules 316.

The set of comparison modules 316 may be configured to determine whether the amplitude difference 312 falls below a first threshold value, whether the frequency difference 313 falls below a second threshold value, and whether the phase difference 314 falls below a third threshold value. In some embodiments, the set of comparison modules 316 may be implemented as comparators.

The system controller circuit 124 may further include a logic module 318 configured to generate the switch control signal 142 based on an output from the set of comparison modules 316. In some embodiments, the logic module 318 may be implemented as logic circuitry and may perform a three input AND function to generate the switch control signal 142.

The system controller circuit 124 may also include a set of proportional-integral-derivative controllers 320 configured to generate an excitation synchronization signal 208 based on the amplitude difference 312, the frequency difference 313, and the phase difference 314.

The amplitude and phase analyzer modules 302, 304, the difference modules 310, the comparison modules 316, the logic module 318, and the set of proportional-integral-derivative controllers 320 may be included within the synchronization control module 202 of FIG. 2. Further, each of components and/or modules described in FIGS. 3A and 3B may be implemented as hardware logic circuitry or a processor and a memory storing instructions that cause the processor to perform functions associated with the components and/or modules described in FIG. 3.

Referring to FIG. 3B, the system controller circuit 124 may receive a speed reference value 144. The speed reference value 144 may be multiplied by a constant at a constant multiplier module 330 to convert the speed reference value 144 into a reference frequency value 332.

A negative slope voltage-frequency control module 334 may be configured to receive the reference frequency value 332 and to calculate an intermediate excitation reference voltage 336 based on the reference frequency value 332. As described further with reference to FIG. 4, the negative slope voltage-frequency control module 334 may store data that maps voltage values with rotor frequency values in order to determine the intermediate excitation reference voltage 336, from which an excitation reference voltage 356 may be derived. For example, the negative slope voltage-frequency control module 334 may be implemented as a lookup table. The data values stored at the negative slope voltage-frequency control module 334 may be predetermined and may be based on a type of motor to be started.

Also based on the reference frequency value 332, a first difference circuit 344 may be configured to generate an intermediate excitation reference frequency value 346 by calculating a difference between the reference frequency value 332 and the second voltage frequency signal 323 of the second AC voltage 126.

The intermediate excitation reference voltage 336 may be received at a second difference circuit 338, a first proportional-integral-derivative controller 340, and a first slope module 342 positioned in a feedback configuration in order to convert the intermediate excitation reference voltage into an excitation reference voltage 356. The first slope module 342 may limit the rate of change of the excitation reference voltage 356. This may give a motor sufficient time to change speed due to mechanical dynamics, which may be slower than electromagnetic dynamics.

Likewise, the intermediate excitation reference frequency value 346 may be received at a third difference circuit 348, a second proportional-integral-derivative controller 350, and a second slope module 352 positioned in a feedback configuration in order to convert the intermediate excitation reference frequency value 346 into a reference excitation frequency 357. The second slope module 352 may limit the rate of change of the reference excitation frequency 357 to gradually change the reference excitation frequency 357 over a period of time.

The system controller circuit 124 may further include a memory module 354 configured to store a measured phase value 324 and to generate a reference excitation phase 358 that matches the measured phase value 324. An excitation reference signal 210 may include the excitation reference voltage 356, the reference excitation frequency 357, and the reference excitation phase 358.

A first switch 341 (FIG. 3A) and a second switch 343 (FIG. 3B) may be selectively controlled by the switch control signal 142. The first switch 341 and the second switch 343 may make up the switch 214 of FIG. 2. Together, the first switch 341 and the second switch 343 may determine whether to route the excitation synchronization signal 208 to the excitation source control module 206 during a synchronization phase or to route the excitation reference signal 210 to the excitation source control module 206 during a motor speed regulation phase. The first switch 341 may determine whether to feed the excitation synchronization signal 208 or the excitation reference signal 210 to the excitation source control module 206. The second switch 343 may selectively insert the second voltage amplitude signal 322, the second voltage frequency signal 323, and the second voltage phase value 324 as inputs into the first slope module 342, the second slope module 352, and the memory module 354, respectively, instead of basing the inputs on the reference frequency value 332. During a synchronization phase, the second voltage amplitude signal 322, the second voltage frequency signal 323, and the second voltage phase value 324 may be used to determine the excitation reference signal 210. During a speed regulation phase, the intermediate excitation reference voltage 336, the intermediate excitation reference frequency value 346, and the second voltage phase value 324 (stored at the memory module 354) may be used to determine the excitation reference signal 210.

The constant multiplier module 330, the negative slope voltage-frequency control module 334, the difference circuits 344, 338, 348, the proportional-integral-derivative controllers 340, 350, and slope modules 342, 352, and the memory module 354 may correspond to the motor speed control module 204.

Based on either the excitation synchronization signal 208 or the excitation reference signal 210, depending on a state of the first switch 341, the excitation source control module 206 may generate the excitation source control signal 212.

As explained herein, the excitation source control signal 212 may include the amplitude excitation source control signal 130, the frequency excitation source control signal 131, and the phase excitation source control signal 132. Based on the excitation source control signal 212, the excitation source circuit 128 may generate an excitation signal (e.g., the excitation signal 114 of FIG. 1) to apply to a set of rotor windings (e.g., the set of rotor windings 110 of FIG. 1).

A benefit of the system controller circuit 124 is that a motor may be started using a two-phase sequence including a synchronization phase and a speed regulation phase, without immediately connecting the motor to an AC bus. As such damage and premature wearing due to a sudden surge of power may be avoided. Other benefits may exist.

Figure 4:
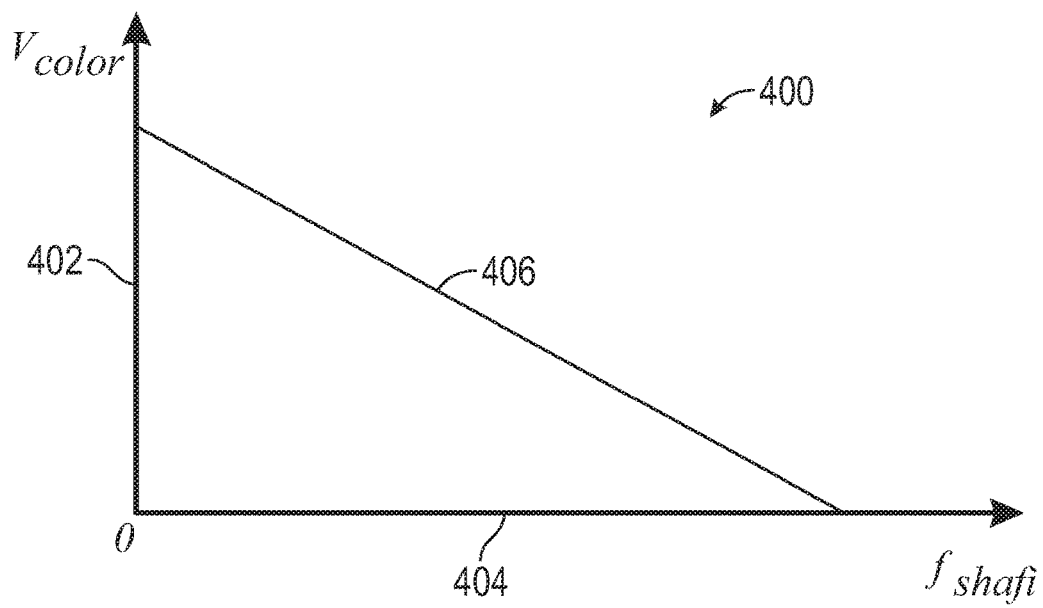
FIG. 4 is a chart depicting negative slope voltage-frequency data for used with a system for starting a VFIS motor and for speed control.

Referring to FIG. 4, a chart depicting negative slope voltage-frequency data 400 for used with a system for starting a VFIS motor and for speed control is depicted. For example, the data 400 may be used as part of the negative slope voltage-frequency control module 334. As depicted in FIG. 4, the data 400 may map voltage values 402 with rotor frequency values 404 along a negative slope line 406. As such, the data 400 may be used (e.g., as a lookup table) to determine a voltage for use in generating an excitation signal based on a desired frequency of a motor shaft.

Figure 5:
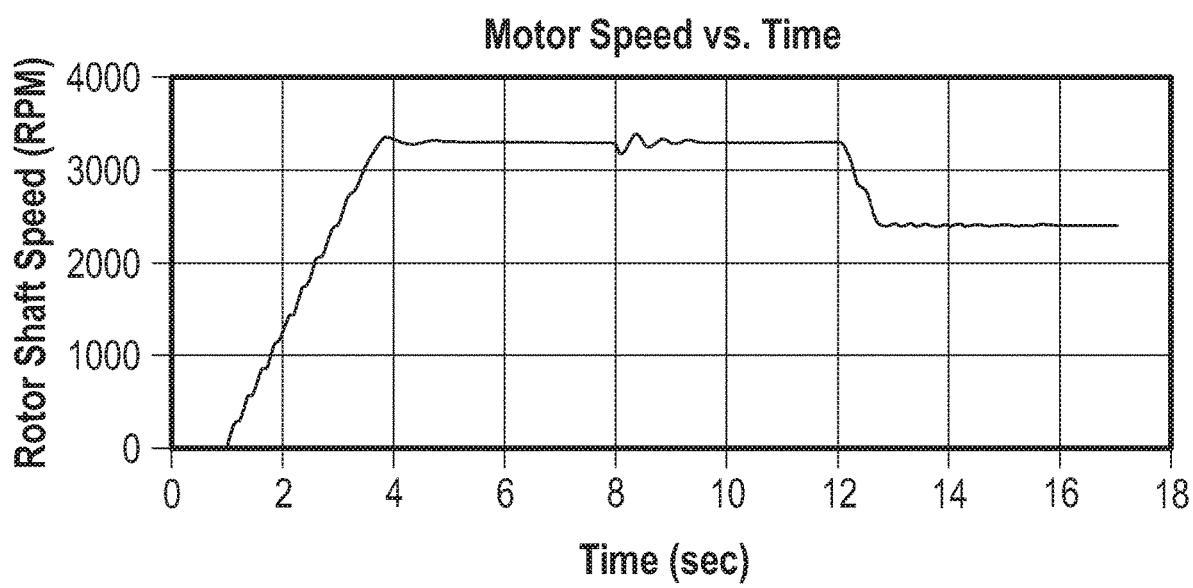
FIG. 5 is a chart depicting results of a simulation of a system for starting a VFIS motor and for speed control.

Referring to FIG. 5, a chart depicting results of a simulation of a system for starting a VFIS motor and for speed control is depicted. The chart plots a rotation shaft speed of a motor over time.

From zero seconds to 1 second, the system 100 is operating in a synchronization phase. In this phase, the switch 120 is open and there is no electrical connection between the AC bus 122 and the set of stator windings 108. As such, no current is flowing into the set of stator windings 108 and the rotor does not move. Hence, the rotation shaft speed is zero.

At 1 second, the switch 120 is closed and from 1 second to 4 seconds the rotation shaft speed gradually climbs to 3300 rotations per minute (RPM) to match a speed reference value. In order to produce the gradual climb, an amplitude of the excitation signal 114 is gradually reduced resulting in a current gradually building within the set of stator windings 108. The gradual reduction in the amplitude is determined based on the negative slope voltage frequency data 400 depicted in FIG. 4. The rotation shaft speed is held at 3300 RPM without having a load attached to the motor 102.

At 8 seconds, a load is attached to the shaft. The load may cause some disturbance, but the system 100 continually controls the motor 102 through the excitation signal 114 to recover and hold the shaft speed at 3300 RPM from 8 seconds to 12 seconds.

At 12 seconds, the reference speed is adjusted to 2400 RPM. The shaft speed gradually decreases to match the reference speed. By 13 seconds, the shaft speed has reached 2400 RPM and remains there for the duration of the simulation.

By using the negative slope voltage frequency relationship to gradually apply a current to the motor 102 and thereby gradually increase a shaft rotation speed, as shown in FIG. 5, sudden currents and short circuits may be avoided, prolonging the lifespan of the motor 102. Other advantages may exist.

Referring to FIG. 6, a method 600 for starting a VFIS motor and for speed control is depicted. The method 600 may include transmitting an excitation signal from a stator of a motor to a rotor of the motor, at 602, where the excitation signal is received at a set of rotor windings, and where the excitation signal produces a rotating magnetic flux at the rotor, the rotating magnetic flux generating a first AC voltage at a set of stator windings. For example, the excitation signal 114 may be transmitted from the stator 104 to the rotor 106 and received at the set of rotor windings 110.

The method 600 may further include controlling the excitation signal to equalize a first amplitude of the first AC voltage at the set of stator windings to a second amplitude of a second AC voltage at an AC bus and to synchronize the first AC voltage to the second AC voltage, at 604. For example, the excitation signal 114 may be controlled to equalize the first AC voltage 118 to the second AC voltage 126.

The method 600 may also include, after the first AC voltage at the set of stator windings is synchronized with the second AC voltage at the AC bus, electrically connecting the set of stator windings to the AC bus, at 606. For example, the switch 120 may be closed to electrically connect the AC bus 122 to the set of stator windings 108.

The method 600 may include reducing an amplitude of the excitation signal to enable current flow from the AC bus to the set of stator windings, thereby generating torque that results in rotation of the rotor, at 608. For example, an amplitude of the excitation signal 114 may be reduced to enable current flow from the AC bus 122 to the set of stator windings 108.

A benefit of the method 600 is that the motor 102 may be started gradually without causing short circuits or current spikes. Other benefits may exist.

Figure 6B:
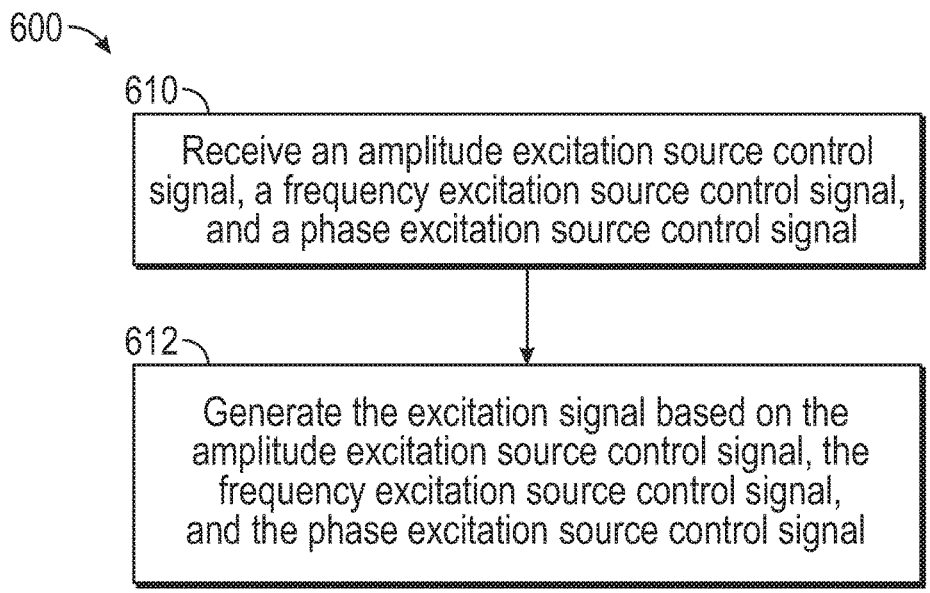
FIG. 6B is a flow diagram depicting a continuation of the method of FIG. 6A.

Referring to FIG. 6B, a continuation of the method 600 may include receiving an amplitude excitation source control signal, a frequency excitation source control signal, and a phase excitation source control signal, at 610. The method 600 may further include generating the excitation signal based on the amplitude excitation source control signal, the frequency excitation source control signal, and the phase excitation source control signal, at 612.

Figure 6C:
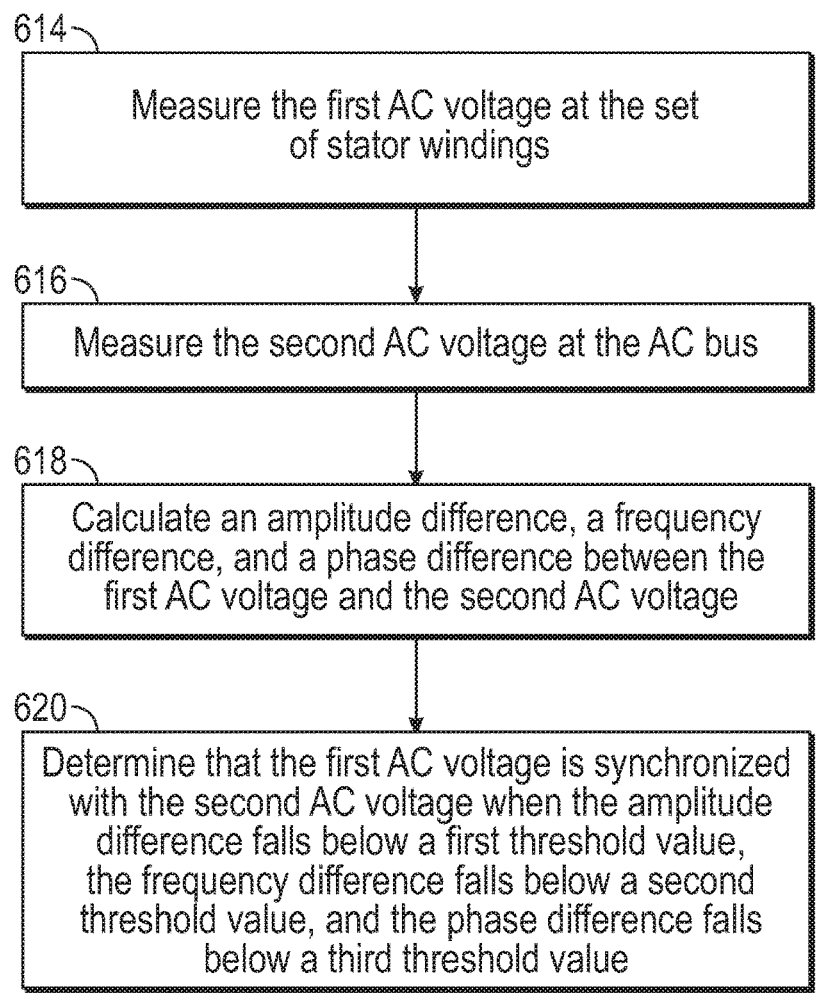
FIG. 6C is a flow diagram depicting a continuation of the method of FIG. 6A.

Referring to FIG. 6C, a continuation of the method 600 may include measuring the first AC voltage at the set of stator windings, at 614. The method 600 may further include measuring the second AC voltage at the AC bus, at 616. The method 600 may also include calculating an amplitude difference, a frequency difference, and a phase difference between the first AC voltage and the second AC voltage, at 618. The method 600 may include determining that the first AC voltage is synchronized with the second AC voltage when the amplitude difference falls below a first threshold value, the frequency difference falls below a second threshold value, and the phase difference falls below a third threshold value, at 620.

Figure 6D:
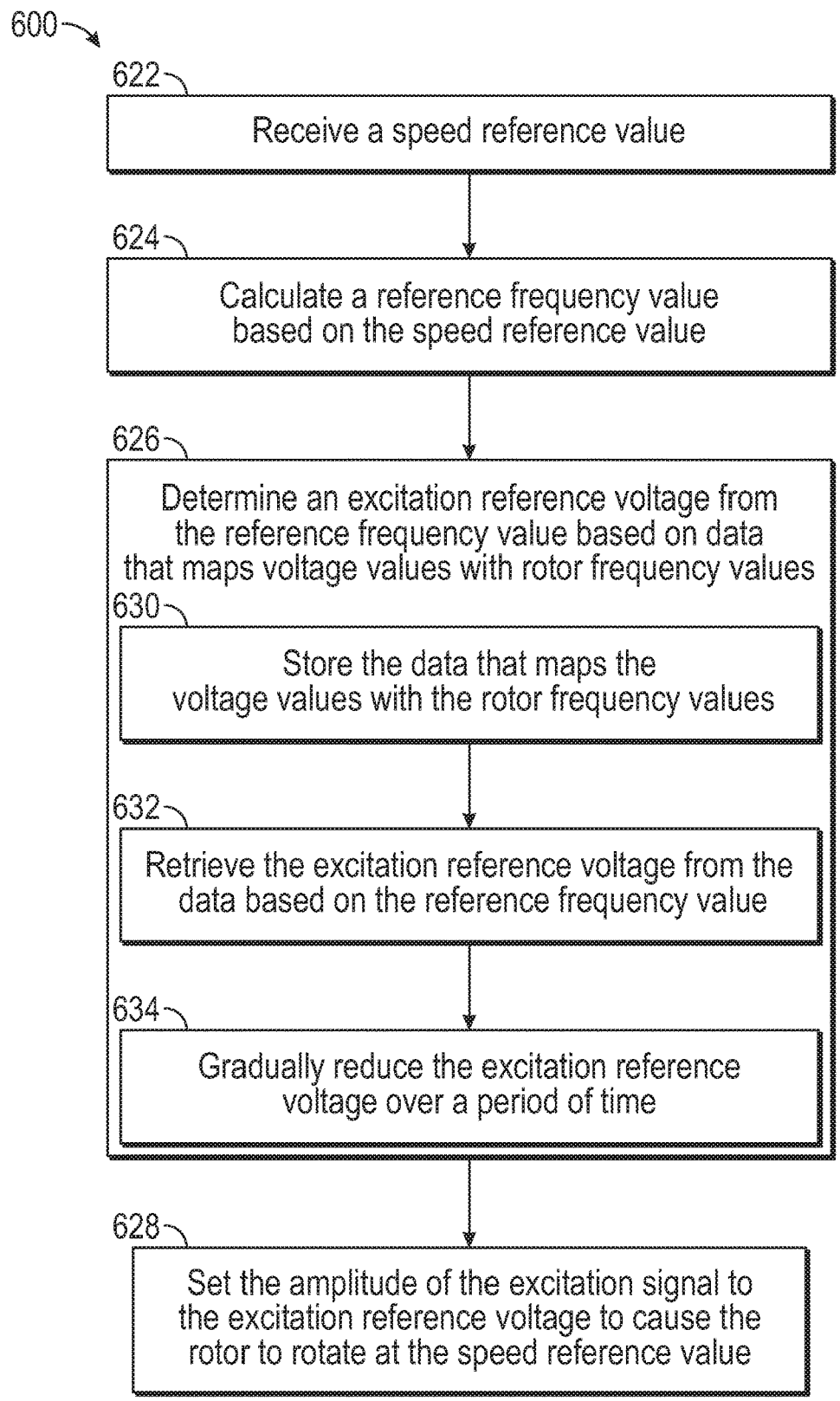
FIG. 6D is a flow diagram depicting a continuation of the method of FIG. 6A.

Referring to FIG. 6D, a continuation of the method 600 may include receiving a speed reference value, at 622. The method 600 may further include calculating a reference frequency value based on the speed reference value, at 624. The method 600 may also include determining an excitation reference voltage from the reference frequency value based on data that maps voltage values with rotor frequency values, at 626. The method 600 may include setting the amplitude of the excitation signal to the excitation reference voltage to cause the rotor to rotate at the speed reference value, at 628.

Determining the excitation reference voltage may include storing the data that maps the voltage values with the rotor frequency values, at 630. Determining the excitation reference voltage may further include retrieving the excitation reference voltage from the data based on the reference frequency value, at 632. Determining the excitation reference voltage may also include gradually reducing the excitation reference voltage over a period of time, at 634.

Figure 6E:
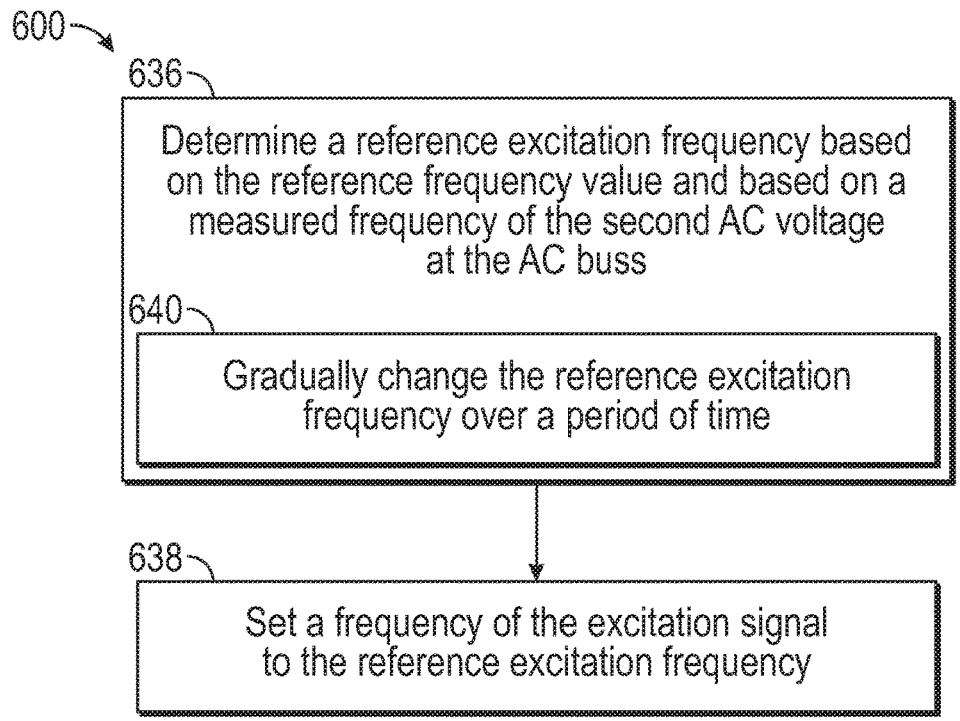
FIG. 6E is a flow diagram depicting a continuation of the method of FIG. 6A.

Referring to FIG. 6E, a continuation of the method 600 may include determining a reference excitation frequency based on the reference frequency value and based on a measured frequency of the second AC voltage at the AC bus, at 636. The method 600 may further include setting a frequency of the excitation signal to the reference excitation frequency, at 638. Determining the reference excitation frequency may include gradually changing the reference excitation frequency over a period of time, at 640.

Figure 6F:
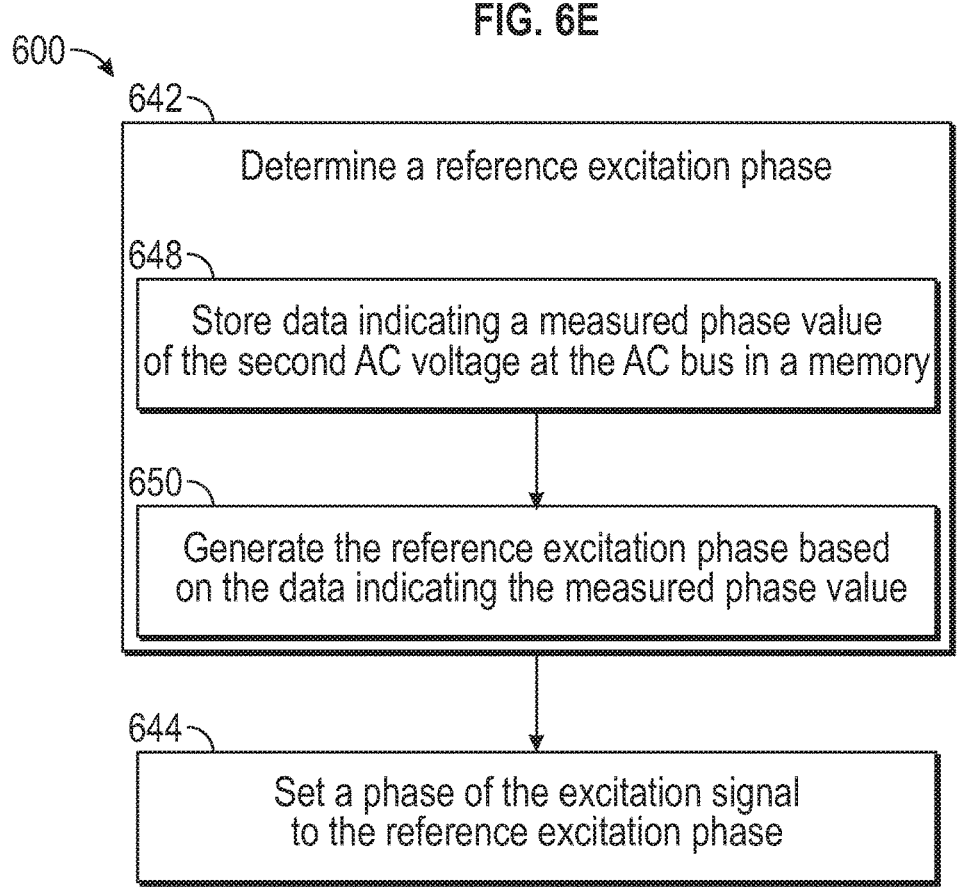
FIG. 6F is a flow diagram depicting a continuation of the method of FIG. 6A.

Referring to FIG. 6F, a continuation of the method 600 may include determining a reference excitation phase, at 642. The method 600 may further include setting a phase of the excitation signal to the reference excitation phase, at 644. Determining the reference excitation phase may include storing data indicating a measure phase value of the second AC voltage at the AC bus in a memory, at 648. Determining the reference excitation phase may further include generating the reference excitation phase based on the data indicating the measured phase value, at 650.

Although various embodiments have been shown and described, the present disclosure is not so limited and will be understood to include all such modifications and variations as would be apparent to one skilled in the art.

What is claimed is:

1. A system comprising:
 a motor having a stator, a rotor, a set of stator windings, and a set of rotor windings;
 a high frequency transformer configured to transmit an excitation signal from the stator to the rotor, wherein the excitation signal is received at the set of rotor windings, and wherein the excitation signal produces a rotating magnetic flux at the rotor, the rotating magnetic flux generating a first alternating current (AC) voltage at the set of stator windings;
 a switch electrically connected between the set of stator windings and an AC bus; and
 a controller circuit configured to control the excitation signal to equalize a first amplitude of the first AC voltage at the set of stator windings to a second amplitude of a second AC voltage at the AC bus and to synchronize the first AC voltage to the second AC voltage, the control circuit further configured to close the switch after the first AC voltage is synchronized with the second AC voltage and to reduce an amplitude of the excitation signal to enable current flow from the AC bus to the set of stator windings, thereby generating torque that results in rotation of the rotor.

2. The system of claim 1, further comprising:
 an excitation source circuit configured to receive an amplitude excitation source control signal, a frequency excitation source control signal, and a phase excitation source control signal from the controller circuit, and to generate the excitation signal based on the amplitude excitation source control signal, the frequency excitation source control signal, and the phase excitation source control signal.

3. The system of claim 1, further comprising:
 a first voltage signal sensor electrically coupled between the switch and the set of stator windings, and configured to provide a measurement of the first AC voltage at the set of stator windings to the controller circuit; and
 a second voltage signal sensor electrically coupled between the AC bus and the switch, and configured to provide a measurement of the second AC voltage.

4. The system of claim 1, wherein the motor is a variable frequency independent speed (VFIS) motor.

5. The system of claim 1, wherein the set of stator windings is a set of 3-phase stator windings, and wherein the set of rotor windings is a set of 3-phase rotor windings.

6. The system of claim 1, wherein the AC bus is a 3-phase AC bus.

7. A method comprising:
transmitting an excitation signal from a stator of a motor to a rotor of the motor, wherein the excitation signal is received at a set of rotor windings, and wherein the excitation signal produces a rotating magnetic flux at the rotor, the rotating magnetic flux generating a first alternating current (AC) voltage at a set of stator windings;
controlling the excitation signal to equalize a first amplitude of the first AC voltage at the set of stator windings to a second amplitude of a second AC voltage at an AC bus and to synchronize the first AC voltage to the second AC voltage;
after the first AC voltage at the set of stator windings is synchronized with the second AC voltage at the AC bus, electrically connecting the set of stator windings to the AC bus; and
reducing an amplitude of the excitation signal to enable current flow from the AC bus to the set of stator windings, thereby generating torque that results in rotation of the rotor.

8. The method of claim 7, further comprising:
receiving an amplitude excitation source control signal, a frequency excitation source control signal, and a phase excitation source control signal; and
generating the excitation signal based on the amplitude excitation source control signal, the frequency excitation source control signal, and the phase excitation source control signal.

9. The method of claim 7, further comprising:
measuring the first AC voltage at the set of stator windings;
measuring the second AC voltage at the AC bus;
calculating an amplitude difference, a frequency difference, and a phase difference between the first AC voltage and the second AC voltage; and
when the amplitude difference falls below a first threshold value, the frequency difference falls below a second threshold value, and the phase difference falls below a third threshold value, determining that the first AC voltage is synchronized with the second AC voltage.

10. The method of claim 7, further comprising:
receiving a speed reference value;
calculating a reference frequency value based on the speed reference value;
determining an excitation reference voltage from the reference frequency value based on data that maps voltage values with rotor frequency values; and
setting the amplitude of the excitation signal to the excitation reference voltage to cause the rotor to rotate at the speed reference value.

11. The method of claim 10, wherein determining the excitation reference voltage comprises:
storing the data that maps the voltage values with the rotor frequency values; and
retrieving the excitation reference voltage from the data based on the reference frequency value.

12. The method of claim 10, wherein determining the excitation reference voltage further comprises:
gradually reducing the excitation reference voltage over a period of time.

13. The method of claim 10, further comprising:
determining a reference excitation frequency based on the reference frequency value and based on a measured frequency of the second AC voltage at the AC bus; and
setting a frequency of the excitation signal to the reference excitation frequency.

14. The method of claim 13, wherein determining the reference excitation frequency further comprises:
gradually changing the reference excitation frequency over a period of time.

15. The method of claim 10, further comprising:
determining a reference excitation phase; and
setting a phase of the excitation signal to the reference excitation phase.

16. The method of claim 15, wherein determining the reference excitation phase comprises:
storing data indicating a measured phase value of the second AC voltage at the AC bus in a memory; and
generating the reference excitation phase based on the data indicating the measured phase value.

17. A system comprising:
a synchronization control module configured to measure a first AC voltage at a set of stator windings, to measure a second AC voltage at an AC bus, to generate an excitation synchronization signal based on the first AC voltage and the second AC voltage, and to generate a switch control signal based on the first AC voltage and the second AC voltage;
a motor speed control module configured to receive a speed reference value and measurements of the second AC voltage and to generate an excitation reference signal based on the speed reference value and the measurements of the second AC voltage;
an excitation source control module configured to generate an excitation source control signal based on the excitation synchronization signal or based on the excitation reference signal; and
a switch configured to route the excitation synchronization signal to the excitation source control module during a synchronization phase and to route the excitation reference signal to the excitation source control module during a motor speed regulation phase.

18. The system of claim 17, wherein the synchronization control module comprises:
a first amplitude and phase analyzer module configured to measure the first AC voltage;
a second amplitude and phase analyzer module configured to measure the second AC voltage;
a set of difference modules configured to calculate an amplitude difference, a frequency difference, and a phase difference between the first AC voltage and the second AC voltage;
a set of comparison modules configured to determine whether the amplitude difference falls below a first threshold value, whether the frequency difference falls below a second threshold value, and whether the phase difference falls below a third threshold value;
a logic module configured to generate the switch control signal based on an output from the set of comparison modules; and
a set of proportional-integral-derivative controllers configured to generate the excitation synchronization signal based on the amplitude difference, the frequency difference, and the phase difference.

19. The system of claim 17, wherein the motor speed control module comprises:
a constant multiplier module configured to convert the speed reference value into a reference frequency value;

a negative slope voltage-frequency control module configured to receive the reference frequency value and to calculate an intermediate excitation reference voltage based on the reference frequency value;

a first difference circuit configured to generate an intermediate excitation reference frequency value based on the reference frequency value and based on a measured frequency of the second AC voltage at the AC bus;

a second difference circuit, a first proportional-integral-derivative controller, and a first slope module configured together to generate an excitation reference voltage and to gradually change the excitation reference voltage over a period of time to match the intermediate excitation reference voltage; and a third difference circuit, a second proportional-integral-derivative controller, and a second slope module configured together to generate an excitation reference frequency value based on the intermediate excitation reference frequency value and to modify the excitation reference frequency value over the period of time to match the intermediate excitation reference frequency value, wherein the excitation reference signal includes the excitation reference voltage and the excitation reference frequency value.

20. The system of claim 19, wherein the motor speed control module comprises:

a memory module configured to store a measured phase value and to generate an excitation reference phase value that matches the measured phase value, wherein the excitation reference signal includes the excitation reference phase value.

* * * * *